(12) United States Patent
Ochi et al.

(10) Patent No.: US 6,335,464 B1
(45) Date of Patent: Jan. 1, 2002

(54) PROCESS FOR SELECTIVELY OXIDIZING PRIMARY HYDROXYL GROUPS OF ORGANIC COMPOUNDS, AND RESIN CONTAINING ADSORBED CATALYST FOR USE THEREIN

(75) Inventors: Kiyoshige Ochi; Hidenori Takahashi, both of Tokyo; Hideki Tanaka; Hiroshi Sugiyama, both of Shizuoka; Isao Fujisaki; Kazutomo Ori, both of Tokyo, all of (JP)

(73) Assignee: Chugai Seiyaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/508,176

(22) PCT Filed: Aug. 31, 1998

(86) PCT No.: PCT/JP98/03877

§ 371 Date: Mar. 8, 2000

§ 102(e) Date: Mar. 8, 2000

(87) PCT Pub. No.: WO99/12644

PCT Pub. Date: Mar. 18, 1999

(30) Foreign Application Priority Data

Sep. 8, 1997 (JP) ............................................. 9-243015

(51) Int. Cl.⁷ ........................ C07C 27/10; C07C 305/12
(52) U.S. Cl. ...................... 562/512.2; 549/314; 536/4.1
(58) Field of Search ...................... 562/512.2; 549/314; 536/4.1

(56) References Cited

U.S. PATENT DOCUMENTS

| | | | |
|---|---|---|---|
| 5,831,043 A | 11/1998 | Fleche | 536/18.5 |
| 5,912,361 A | 6/1999 | Tsuchioka et al. | 549/311 |

FOREIGN PATENT DOCUMENTS

| | | |
|---|---|---|
| JP | 2604826 | 1/1997 |
| JP | 9 235291 | 9/1997 |
| JP | 10 251268 | 9/1998 |

OTHER PUBLICATIONS

Miyzawa et al., "Application of Nitroxyl Radical Derivatives to Organic Synthesis", *Journal of Synthetic Organic Chemistry*, vol. 44, No. 12, pp. 1134–1144, (1986).

Nooy et al., "On the Use of Stable Organic Nitroxyl Radicals for the Oxidation of Primary and Secondary Alcohols", *Review*, pp. 1153–1174, (1995).

*Primary Examiner*—Amelia Owens
(74) *Attorney, Agent, or Firm*—Browdy And Neimark, P.L.L.C.

(57) ABSTRACT

A method for selectively oxidizing the primary hydroxyl group of an organic compound which comprises reacting a resin having an amine oxide adsorbed thereon and an electrolytically oxidized product of a halogen-containing compound with the organic compound having the primary hydroxyl group.

19 Claims, 1 Drawing Sheet

PROCESS FOR SELECTIVELY OXIDIZING PRIMARY HYDROXYL GROUPS OF ORGANIC COMPOUNDS, AND RESIN CONTAINING ADSORBED CATALYST FOR USE THEREIN

CROSS REFERENCE TO RELATED APPLICATION

The present application is the national stage under 35 U.S.C. 371 of PCT/JP98/03877, filed Aug. 31, 1998.

TECHNICAL FIELD

This invention relates to a resin on which an amine oxide to be used as a catalyst in a selective oxidation reaction of an organic compound having primary hydroxyl group is adsorbed, a method for selectively oxidizing the primary hydroxyl group of an organic compound by using this resin, and a method for recovering the amine oxide used in the oxidation reaction. The present invention further relates to a method for producing uronic acid derivatives such as glucuronic acid derivatives and a method for producing glucuronic acid or glucuronolactone.

BACKGROUND ART

Glucuronic acid, glucuronolactone and derivatives thereof have been broadly used as drugs. To industrially synthesize glucuronic acid derivatives serving as intermediates in the synthesis of glucuronic acid and glucuronolactone, it has been a practice to selectively oxidize the primary hydroxyl group of a starting material (glucose derivative, saccharide such as starch, etc.) by using a nitrogen oxide (nitric acid, etc.) as an oxidizing agent to thereby convert the starting material into a carboxylic acid (Japanese Patent Publication for Opposition (Kokoku) 46-38781).

However, the above-described method suffers from some disadvantages. That is to say, expensive nitrogen oxide should be used therein as an oxidizing agent. In addition, it is feared that nitrogen oxide gases generated as by-products in the oxidation reaction might cause public pollution. Therefore, these gases are oxidized with air to give the original nitrogen oxide and then recovered and reused. Thus, troublesome operations and a device for the recovery of the nitrogen oxide are needed therefor.

In recent years, there have been disclosed a method for producing uronic acid derivatives by selectively oxidizing the primary hydroxyl group of a monosaccharide derivative (methyl glucoside, etc.) with 2,2,6,6-tetramethylpiperidine N-oxyl (hereinafter referred to simply as TEMPO) as an oxidizing catalyst (Tetrahedron Letters, 34(7), 1181–1184 (1993)) and a method for highly selectively oxidizing a primary alcohol by electrolytically oxidizing the primary alcohol together with an N-oxyl compound (TEMPO, etc.) (see, for example, Japanese Laid-open Patent Publication (Kokai) 2-107790). Namely, it has been indicated that amine oxides such as hindered nitroxide typified by TEMPO are useful as catalysts in selectively oxidizing primary hydroxyl group of compounds.

Also, there has been publicly known a method for producing a sugar carboxylic acid or a sugar lactone at a high yield under mild conditions by electrolyzing an liquid electrolysis mixture containing a saccharide with a ruthenium compound and a halogen salt dissolved in an electrolyte in an electrolysis cell and then collecting the sugar carboxylic acid or sugar lactone thus oxidized by the oxidation of the primary or secondary hydroxyl group of the saccharide (Japanese Patent Publication for Opposition (Kokoku) 63-46153).

However, these catalysts are generally expensive. In the industrial application, therefore, these catalysts are recovered and reused so as to cut down the production cost and reduce the waste. Since such a catalyst usually occurs as a solution in the reaction system, troublesome and inefficient procedures (azeotropic distillation with water, extraction with an organic solvent, etc.) should be performed to recover the catalyst and, moreover, a recovery device is needed therefor, thus bringing about problems in handling and cost.

Moreover, many amine oxides exert undesirable effects on the human body and, therefore, must be handled cautiously.

Accordingly, no satisfactory method has been developed so far for conveniently and efficiently oxidizing the primary hydroxyl group of an organic compound with the use of an amine oxide as a catalyst.

DISCLOSURE OF THE INVENTION

Under these circumstances, an object of the present invention is to provide an industrial method for selectively oxidizing the primary hydroxyl group of an organic compound wherein an amine oxide can be safely, conveniently and efficiently employed as a catalyst. Another object of the present invention is to provide a method for conveniently producing glucuronic acid or glucuronolactone, which are useful as drugs, involving the step of synthesizing an uronic acid derivative useful as an intermediate in the synthesis of glucuronic acid or glucuronolactone, while considering the environmental safeguards.

As the results of intensive studies, the present inventors have found that, in a method for producing glucuronic acid or glucuronolactone, a glucuronic acid or glucuronolactone intermediate can be produced by using an amine oxide as a catalyst in a reaction of oxidizing a saccharide without resort to any nitrogen oxide as an oxidizing agent.

The present inventors have further found that in a method for oxidizing the primary hydroxyl group of an organic compound such as a saccharide, the oxidization can be conveniently and efficiently, compared with the conventional methods, carried out by using as a catalyst a resin carrier (polyacrylic resin, polystyrene resin, polyalkylene resin, etc.) having an amine oxide adsorbed thereon and using as an oxidizing agent a halogen-containing oxidant or an electrolytically oxidized product of a halogen-containing compound. The present invention has been completed based on these findings.

Accordingly, the present invention relates to a resin on which an amine oxide is adsorbed as a catalyst to be used in the selective oxidation reaction of an organic compound having primary hydroxyl group.

The present invention further relates to a method for selectively oxidizing the primary hydroxyl group of an organic compound which comprises reacting the organic compound and a resin having an amine oxide adsorbed thereon with a halogen-containing oxidant or an electrolytically oxidized product of a halogen-containing compound. More particularly, it relates to the above-described oxidation method wherein an oxidation reaction cell for the organic compound containing the resin having the amine oxide adsorbed thereon is located separately from an electrolytic reaction cell for the halogen-containing compound. Still particularly, it relates to a method for producing an uronic acid derivative by using the above-described oxidation method.

The present invention further relates to a method for producing a glucuronic acid derivative which comprises reacting an optionally substituted saccharide and an amine oxide with an electrolytically oxidized product of a halogen-containing compound. More particularly, it relates to the above-described oxidation method wherein the resin is a polyacrylic resin, a polystyrene resin or a polyalkylene resin. Still particularly, it relates to the above oxidation method wherein the organic compound is an optionally substituted saccharide. It also relates to a method for producing a glucuronic acid derivative wherein an optionally substituted saccharide is electrolytically oxidized together with an amine oxide. The present invention furthermore relates to a method for producing a glucuronic acid derivative which comprises oxidizing by the use of a hologen-containing oxidant or electrolytically oxidizing an optionally substituted saccharide together with a resin having an amine oxide adsorbed thereon.

The term "organic compound" as used in the present invention involves organic compounds having primary hydroxyl group. Examples thereof include lower and higher alcohols having primary hydroxyl group (the term "lower" as used herein means having 1 to 10 carbon atoms, while the term "higher" as used herein means having 11 or more carbon atoms), alkoxyalkanoic aicds having primary hydroxyl group, polyoxyalkylene siloxanes having primary hydroxyl group, polyoxyalkyleneamines having primary hydroxyl group, alkylpolyoxyalkylenes having primary hydroxyl group, polyoxyalkylene block polymers having primary hydroxyl group, alkylamidopolyoxyalkylenes having primary hydroxyl group, alkyl polyglucosides having primary hydroxyl group and optionally substituted saccharides having primary hydroxyl group. Preferable examples of the organic compound to be used in the present invention include lower and higher alcohols having primary hydroxyl group, alkylpolyglucosides having primary hydroxyl group and optionally substituted saccharides having primary hydroxyl group.

Examples of the lower and higher alcohols having primary hydroxyl group include methanol, ethanol, propyl alcohol, butyl alcohol, pentyl alcohol, hexyl alcohol, octyl alcohol, nonyl alcohol, decyl alcohol, lauryl alcohol, tridecyl alcohol, myristyl alcohol, pentadecyl alcohol, cetyl alcohol, heptadecyl alcohol, stearyl alcohol, nonadecyl alcohol, eicosyl alcohol, ceryl alcohol, melissyl alcohol, allyl alcohol, crotyl alcohol and propargyl alcohol.

Examples of the optionally substituted saccharides having primary hydroxyl group include monosaccharide glycosides wherein monosaccharides are substituted at the 1-position (i.e., the reducing end thereof) by lower or higher alcohols, derivatives wherein monosaccharides are protected at the reducing end by hemiacetals with lower alcohols, derivatives wherein the reducing end and the hydroxyl group at the 2-position form lower ketal or aromatic ketal rings, oligosaccharides wherein a constituting saccharide is substituted at the 1-position by another constituting saccharide, and glycosides wherein the monosaccharides form glycosides with lower alcohols at the 1-position. More particularly speaking, examples thereof include methyl-α-D-glucopyranoside, methyl-β-D-glucopyranoside, isopropyl-α-D-glucopyranoside, isopropyl-β-D-glucopyranoside, benzyl-α-D-glucopyranoside, benzyl-β-D-glucopyranoside, glucose diethylacetal, 1,2-O-isopropylidene glucose, 1,2-cyclohexylidene glucose, 1,2-O-benzylidene glucose, etc.

Examples of the alkyl polyglucosides having primary hydroxyl group include maltose, methyl maltoside, benzyl maltoside, cellobiose, methyl cellobioside, maltotriose, cyclodextrins, starch semi-hydrolysates, sucrose, lactose, etc.

The term "amine oxide" as used herein involves secondary amine N-oxyls, tertiary amine N-oxides and oxonium salts thereof which are usable as a catalyst in a reaction of oxidizing an organic compound.

Examples of the secondary amine N-oxyls include di-t-butylamine N-oxyl, di-s-butylamine N-oxyl, 2,2,6,6-tetramethylpiperidine N-oxyl and 4-substituted derivatives thereof, 2,2,5,5-tetramethylpyrrolidine N-oxyl, dicyclohexylamine N-oxyl, etc. Examples of the tertiary amine N-oxides include trimethylamine N-oxide, N-methylmorpholine N-oxide, 2,6-dimethylpyridine N-oxide, 2,5-dimethyopyrrole N-oxide, etc.

As the amine oxide to be used in the present invention, it is particularly preferable to employ 2,2,6,6-tetramethylpiperidine N-oxyl and 4-substitued derivatives thereof including 4-acetamino-2,2,6,6-tetramethylpiperidine N-oxyl, 4-hydroxy-2,2,6,6-tetramethylpiperidine N-oxyl and 4-benzoyloxy-2,2,6,6-tetramethylpiperidine N-oxyl, 2,2,5,5-tetramethylpyrrolidine N-oxyl, dicyclohexylamine N-oxyl and 2,6-dimethylpyridine N-oxide.

The resin to be used in the present invention may be an arbitrary one, so long as it can adsorb the amine oxide and is not decomposed by the halogen oxide employed as the oxidizing agent or the base added thereto. For example, use can be made therefor of polystyrene resins, polyacrylic resins, methacrylic resins, polyalkylene resins (polyethylene resins, polypropylene resins, etc.), dextran, cellulose, agarose and hydrophilic vinyl polymers. It is preferable to use a polystyrene resin or a polyacrylic resin therefor. More particularly speaking, it is preferable to use a polyacrylamide resin, a polyacrylate resin or a polystyrene resin having an aromatic ring substituted by a halogen (fluorine, chlorine, bromine or iodine).

As the resin to be used in the present invention, an adequate one may be selected depending on the molecular weight and physical properties (polarity, etc.) of the amine oxide which is to be adsorbed as a catalyst. The specific surface area of the resin to be used in the present invention ranges preferably from 1 to 1,000 $m^2/g$, still preferably from 20 to 800 $m^2/g$. The pore volume of the resin to be used in the present invention ranges preferably from 0.1 to 2 ml/g, still preferably from 0.5 to 1.2 ml/g.

The shape of the resin to be used in the present invention is not particularly restricted. It may be one which can be easily dispersed in a solution by agitating, one which can be separated from the reaction system by a simple filtration procedure after the completion of the reaction, or one which can be packed into a container such as a column (e.g., beads).

Examples of marketed polyacrylic resin products usable as the resin to be used in the present invention include "Diaion" HP2MG (Mitsubishi Chemical Industries), "Amberlite" XAD-7 (Rohm & Haas), "Amberlite" XAD-8 (Rohm & Haas), etc. Examples of marketed polystyrene resin products usable therefor include "Diaion" HP20 (Mitsubishi Chemical Industries), "Diaion" HP21 (Mitsubishi Chemical Industries), "Sepabeads" SP207 (Mitsubishi Chemical Industries), "Sepabeads" SP825 (Mitsubishi Chemical Industries), "Sepabeads" SP-850 (Mitsubishi Chemical Industries), "Amberlite" XAD-1 (Rohm & Haas), "Amberlite" XAD-2 (Rohm & Haas), "Amberlite" XAD-4 (Rohm & Haas), "Amberlite" XAD-2000 (Rohm & Haas), etc.

The term "halogen-containing compound" as used herein involves compounds capable of forming halogen (i.e., fluorine, chlorine, bromine or iodine) ions in water. Preferable examples thereof include those capable of forming a chlorine or bromine ion. More particularly speaking, use can be made therefor of sodium chloride, potassium chloride, sodium bromide, potassium bromide, calcium chloride or calcium bromide. Preferable examples thereof include sodium chloride, potassium chloride, sodium bromide and potassium bromide.

The terms "halogen-containing oxidant" and "electrolytically oxidized product of a halogen-containing compound" as used herein mean compounds capable of forming halogenic acid ions, i.e., halogen ion oxides such as chlorate, bromate, iodate, chlorite, bromite, iodite, hypochlorite, hypobromite or hypoiodite. Preferable examples thereof include compounds capable of forming hypochlorite and hypobromite ions. More particularly speaking, it is preferable to use sodium chlorate, sodium chlorite, sodium hypochlorite, potassium chlorate, potassium chlorite, potassium hypochlorite, calcium chlorate, calcium chlorite, calcium hypochlorite, sodium bromate, sodium bromite, sodium hypobromite potassium bromate, potassium bromite, potassium hypobromite, calcium bromate, calcium bromite, calcium hypobromite, sodium iodate, sodium iodite, sodium hypoiodite, potassium iodate, potassium iodite, potassium hypolodite, calcium iodate, calcium iodite, calcium hypoiodite, etc. It is preferable to use sodium hypochlorite, potassium hypochlorite, sodium hypobromite or potassium hypobromite.

The term "uronic acid derivative" as used herein involves glycosides of monosaccharides having a hexose protected at the reducing group at the 1-position and oligosaccharides and polysaccharides having these monosaccharides as the constituents thereof wherein the primary hydroxyl group has been converted into a carboxyl group. Particular examples thereof include glucuronic acid derivatives having glucuronic acid as the constituting monosaccharide, mannuronic acid derivatives having mannuronic acid as the constituting monosaccharide and galacturonic acid derivatives having galacturoninc acid as the constituting monosaccharide.

As the "glucuronic acid derivative" to be used in the present invention, it is preferable to select, from among glucuronic acid derivatives having glucuronic acid as the constituting monosaccharide, those capable of forming glucuronic acid or glucuronolactone (i.e., the lactone derivative of glucuronic acid) by hydrolysis. Particular examples thereof include methyl-α-glucopyranosiduronic acid, methyl-β-glucopyranosiduronic acid, isopropyl-α-glucopyranosiduronic acid, isopropyl-β-glucopyranosiduronic acid, 1,2,-O-isopropylidene glucuronolactone, sucrose 6-carboxylic acid, cyclodextrin 6-carboxylic acid and oxidized starch. Among all, it is preferable to use methyl-α-glucopyranosiduronic acid, isopropyl-α-glucopyranosiduronic acid or isopropyl-β-glucopyranoside therefor.

Figure 1:
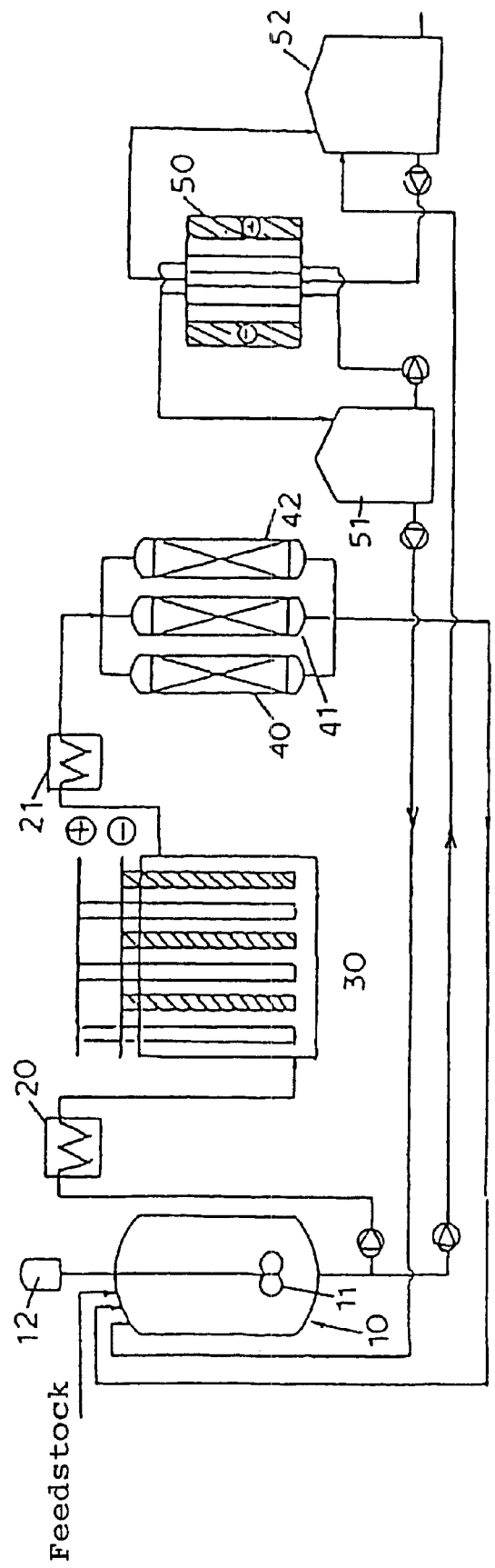
FIG. 1 shows an example of a device to be used for the embodiment of the oxidization method according to the present invention wherein each numerical symbol has the following meaning.

10: feedstock preparation tank
11: agitating element
12: agitator
20: cooling unit 1
21: cooling unit 2
30: electrolytic oxidation device
40: catalyst-adsorption column 1
41: catalyst-adsorption column 2
42: catalyst-adsorption column 3
50: electrolytic dialyzer
51: concentrate tank
52: desalted solution tank.

BEST MODE FOR THE EMBODIMENT OF THE INVENTION

The amine oxide to be used as a catalyst can be adsorbed on the resin by, for example, the following method.

0.1 to 100 mg/ml (preferably 0.3 to 10 mg/ml) of an amine oxide is added to water or an aqueous solution containing a small amount of a solubilizing agent such as an organic solvent (tetrahydrofuran, acetone, methyl ethyl ketone, lower alcohol, etc.) which can be uniformly dispersed in water. Next, 5 to 80% (V/V) (preferably 20 to 50% (V/V)) of a resin is added thereto under agitation. After the addition of the resin, the resultant mixture is stirred for additional 1 minute to 3 hours (preferably 10 to 60 minutes) so that the amine oxide is adsorbed on the resin. Alternatively, the resin in a required amount is packed into a column together with water and an amine oxide solution is passed through the column so as to allow the resin to adsorb the amine oxide.

In this treatment, the temperature of the solution ranges from 0 to 40° C., preferably from 5 to 30° C.

In this treatment, the pH value of the solution ranges from 4 to 14, preferably from 6 to 12.

To enhance the efficiency of the adsorption of the amine oxide on the resin, to prevent the amine oxide thus adsorbed on the resin from desorption or to accelerate the oxidation reaction, it is possible to add an organic acid salt (sodium acetate, sodium formate, etc.) or an inorganic salt (sodium chloride, potassium chloride, sodium bromide, potassium bromide, sodium iodide, potassium iodide, etc.) to the reaction system.

After the adsorption of the amine oxide on the resin, the resin is filtered off from the liquid reaction mixture and then stored as such. Alternatively, it may be washed with water or an aqueous solvent containing an organic acid salt or an inorganic salt and then stored under adequate conditions.

It is also possible that, after the completion of the reaction for oxidizing the organic compound with the use of the amine oxide as a catalyst, the above-described resin is added to the liquid reaction mixture to give the resin having the amine oxide adsorbed thereon by the method as described above.

To prevent the loss of the resin caused by the damage due to the agitation during the reaction or to improve the handling properties of the resin, it is also possible to pack the resin having the amine oxide adsorbed thereon in a water-permeable container (for example, a saran (vinylidene polymer) bag) so as to prevent the resin from scattering.

Moreover, it is possible that the resin having the amine oxide adsorbed thereon is packed in a column, etc. as a stationary phase and an aqueous solution containing a substrate and an oxidizing agent is passed through the column as a mobile phase so as to perform the reaction continuously while cooling the mobile phase and/or the whole column to thereby protect the reaction system from the heat generated during the reaction.

The oxidation reaction of the primary hydroxyl group of an organic compound, wherein the resin having the amine oxide adsorbed thereon as described above is used as a catalyst, while an electrolytically oxidized product of a halogen ion is used as an oxidizing agent, can be carried out in a single electrolytic reaction cell. Alternatively, it can be carried out in another reaction cell separately from the electrolytic reaction cell.

It is advantageous to carry out the above-described reaction in another reaction cell separated from the electrolysis cell. This is because the catalyst can be prevented thereby from decomposition due to the excessive oxidation around the electrodes in the electrolysis cell and thus the catalyst life can be prolonged. In this case, moreover, the deterioration in the resin strength due to the breakage by agitation and a decrease in the resin recovery can be avoided.

In addition, the hypohalogenous acid salt formed in the electrolytic reaction cell can be more efficiently utilized in the oxidation reaction by circulating the liquid reaction mixture alternatively in the electrolytic reaction cell and the oxidation reaction cell and thus repeatedly carrying out the reaction. The starting halogenic acid salt formed by the oxidation reaction can be returned into the electrolysis cell. After the completion of the reaction, the electrolysis cell is switched-off and, at the same time, the circulation of the mobile phase into the electrolysis cell is stopped. Thus, the reaction mixture can be immediately transported into the next stage and the aimed product can be obtained more efficiently.

As the electrolysis cell, use can be made of a simple one of the diaphragm-free structure. The electrode size may be arbitrarily determined depending on the aimed production scale. The electrodes may be made of stainless, platinum, palladium, titanium, etc. Also, the electrodes may be those constructed by coating a base (stainless, titanium, nickel, etc.) with platinum, ruthenium dioxide, iridium or tin. It is adequate that the current density ranges from 0.01 to 0.4 $A/cm^2$, preferably from 0.1 to 0.3 $A/cm^2$.

After the completion of the oxidation reaction, the amine catalyst having been adsorbed on the resin can be desorbed and recovered. As a solvent for the desorption, use can be made of water-soluble organic solvents such as tetrahydrofuran, acetone, methyl ethyl ketone, lower alcohols or aqueous solutions thereof. By suspending the resin in such a solvent as such or passing the solvent through the column packed with the resin, the adsorbed catalyst can be eluted from the resin and thus recovered.

The above-described method is also usable in recovering the amine oxide employed as a catalyst in the oxidation of the organic compound.

The resin having the amine oxide (i.e., a catalyst) adsorbed thereon can be used in the electrolytic oxidation reaction of the primary hydroxyl group of the organic compound by using, for example, the device shown in FIG. 1 as follows.

FIG. 1 is a diagram illustrating an example of the device to be used in the selective oxidation method according to the present invention. Starting materials (alkyl glucoside, etc.), a base and sodium chloride are fed into a feedstock preparation tank (10) and dissolved in water under agitation therein. Then the obtained liquid mixture is transported with a transporting pump and passed through a cooling unit (20) wherein it is subjected to heat-exchange with brine. The mixture thus cooled is then electrolytically oxidized in an electrolytic oxidation cell (30) provided with no diaphragm and thus converted into sodium hypochlorite. Next, it is cooled again in a cooling unit (21) and introduced into columns (40–42) each packed with a resin having a catalyst adsorbed thereon. After the completion of the oxidation reaction by sodium hypochlorite occurring in the columns, the mobile phase containing sodium chloride is returned into the electrolytic oxidation cell where sodium chloride is converted into sodium hypochlorite again. After repeating the circulation and thus confirming that the starting materials have been almost completely consumed and the oxidation reaction has been sufficiently performed, the flow is changed over so that the liquid reaction mixture is transported into a desalted solution tank (52) with a transporting pump. The liquid transported into an electrolytic dialyzer (50) with a transporting pump is electrolytically dialyzed and thus inorganic salts are fed into a concentrate tank while the desalted solution is returned into the desalted solution tank. When the salt concentration of the desalted solution reached a desired level, the dialysis is stopped and the desalted solution is transported to the next stage of hydrolysis. The electrolyte recovered by the electrolytic dialysis is returned from the concentrate tank (51) into the starting feedstock preparation tank (10) with the transporting pump and then reused in the preparation of the feedstock solution again. During the reaction, the salt concentration, the progress of the oxidation, temperature, etc. are monitored at appropriate points in the flow system.

The resin having the amine oxide adsorbed thereon is used in an amount sufficient for performing the catalytic action before the initiation of the reaction. The oxidation reaction can be carried out under the same conditions as those employed in a usual case where the amine oxide alone is employed as a catalyst.

The optimum amount of the catalyst per a definite unit of the resin for performing the catalytic action can be arbitrarily determined depending on the starting materials and reaction conditions employed. In a reaction where the catalyst may be employed only in a small amount, for example, a small amount of the catalyst is adsorbed on a definite amount of the resin. When the reaction cannot smoothly proceed unless the catalyst is used in a large amount, on the other hand, a sufficient amount of the catalyst is adsorbed on a definite amount of the resin and employed. In the former case, therefore, the catalyst can be turned over quickly.

Glucuronic acid or glucuronolactone can be produced by hydrolyzing the glucuronic acid derivatives obtained by the production method according to the present invention.

EXAMPLES

The present invention will be described in greater detail by reference to the following Examples. However, it should be understood that the invention is not construed as being limited thereto.

Example 1

150 mg of 2,2,6,6-tetramethylpiperidine N-oxyl (TEMPO) was added to 150 ml of water. Next, 75 ml of a synthetic polyacrylic resin "Diaion" HP2MG (Mitsubishi Chemical Industries), which had been preliminarily washed and moistened with water, was added thereto under agitating at room temperature. After agitating for 20 minutes, it was confirmed by gas chromatography (detection: FID, column: G-100 (40m), detection temperature: 150° C.) that TEMPO in the aqueous solution had been adsorbed by the resin at a ratio of 98.0% or more. Then the resin having TEMPO adsorbed thereon was filtered off to give about 75 ml of the TEMPO-adsorbing resin.

Example 2

9.7 g of methyl-α-D-glucopyranoside was dissolved in 150 ml of water. Under agitating, 5.3 g of anhydrous sodium carbonate, 2.0 g of sodium bromide and 75 ml of the TEMPO-adsorbing resin obtained in the above Example 1 were added thereto. While maintaining the obtained mixture at an inner temperature of 30° C. or below and agitating, about 190 ml of an aqueous solution of sodium hypochlorite containing 5% of active chlorine was dropped thereinto. After agitating for 1.5 hours, it was confirmed by HPLC (detection: RI, UV 210 nm, column: Shodex SUGAR SH1011, column temperature: 25° C., mobile phase: 0.1% aqueous solution of phosphoric acid; or RI, UV 210 nm, column: Aminex HPX-87H, column temperature: 60° C., mobile phase: 0.1 N sulfuric acid) that methyl-α-D-glucopyranoside had been converted into methyl-α-D-glucopyranosiduronic acid at a ratio of 100%. After the completion of the above-described reaction, it was confirmed by gas chromatography (detection: FID, column: G-100 (40m), column temperature: 150° C.) that no TEMPO was eluted into the liquid reaction mixture.

Example 3

9.7 g of methyl-α-D-glucopyranoside was dissolved in 150 ml of water. Under agitating, 8.0 g of anhydrous sodium carbonate, 2.0 g of sodium bromide and 150 mg of TEMPO were added thereto. While maintaining the obtained mixture at an inner temperature of 30° C. or below and vigorously agitating, about 60 ml of an aqueous solution of sodium hypochlorite containing 12% of active chlorine was dropped thereinto. After agitating for 1.5 it was confirmed by HPLC (detection; RI, UV 210 nm, column: Shodex SUGAR SH1011, column temperature: 25° C., mobile phase: 0.1% aqueous solution of phosphoric acid) that methyl-α-D-glucopyranoside had been converted into methyl-α-D-glucopyranosiduronic acid at a ratio of 100%. Subsequently, 75 ml of a synthetic polyacrylic resin "Diaion" HP2MG (Mitsubishi Chemical Industries), which had been preliminarily washed and moistened with water, was added directly to the liquid reaction mixture under agitating at room temperature, thus allowing the resin to adsorb TEMPO in the liquid reaction mixture. After agitating for 30 minutes, the resin having TEMPO adsorbed thereon was filtered off. When the reaction mixture in the filtrate phase was examined by gas chromatography (detection: FID, column: G-100 (40m), detection temperature: 150° C.), it was confirmed that TEMPO had been recovered from the liquid reaction mixture at a ratio of 97.7%.

Example 4

9.7 g of methyl-α-D-glucopyranoside was dissolved in 150 ml of water. Under agitating, 5.3 g of anhydrous sodium carbonate, 2.0 g of sodium bromide and 150 mg of TEMPO were added thereto. While agitating the obtained mixture at room temperature, 15 ml of a synthetic polystyrene resin "Amberlite" XAD-2 (Rohm & Haas), which had been preliminarily washed and moistened with water, was added thereto. After agitating for 20 minutes, TEMPO in the liquid reaction mixture was detected by gas chromatography (detection: FID, column: G-100 (40m), detection temperature: 150° C.). Thus it was confirmed that TEMPO had been adsorbed by the resin at a ratio of 99.3% or more. When 75 ml of XAD-2 was used under the same conditions, TEMPO was adsorbed at a ratio of almost 100%. When 15 ml of another resin "Amberlite" XAD-4 (Rohm & Haas) was used under the same conditions, TEMPO was adsorbed at a ratio of almost 100%.

Example 5

9.7 g of methyl-α-D-glucopyranoside was dissolved in 150 ml of water. Under agitating, 8.0 g of anhydrous sodium carbonate, 2.0 g of sodium bromide and 75 ml of the TEMPO-adsorbing resin obtained in the above Example 3 were added thereto. While maintaining the obtained mixture at an inner temperature of 30° C. or below and vigorously agitating, about 60 ml of an aqueous solution of sodium hypochlorite containing 12% of active chlorine was dropped thereinto. After agitating for 1.5 hours, it was confirmed by HPLC (detection; RI, UV 210 nm, column: Shodex SUGAR SH1011, column temperature: 25° C., mobile phase: 0.1% aqueous solution of phosphoric acid) that methyl-α-D-glucopyranoside had been converted into methyl-α-D-glucopyranosiduronic acid at a ratio of 100%. Subsequently, the TEMPO-adsorbing resin was filtered off and recovered. The thus recovered resin having TEMPO adsorbed thereon was treated as described above and it was thus confirmed that the resin could be reused.

To the liquid reaction mixture obtained by filtering off the TEMPO-adsorbing resin as described above, a 5% aqueous solution of sodium bisulfide was added until the resultant mixture became negative in the potassium iodine starch paper test. Then dilute hydrochloric acid was added thereto under cooling to thereby adjust the pH value to 4 or less. The thus obtained mixture was diluted with twice as much water and then desalted by passing through an electrodialyzer (Microacylyzer G3: Asahi Chemical Industry). In this step, the electrodialysis was continued until the current and the conductivity of the electrodialyzer attained respectively about 0.1 A or less and about 10 mS/cm or less.

The liquid reaction mixture thus desalted was concentrated. Next, it was confirmed from the residue that methyl-α-D-glucopyranosiduronic acid had been thus formed.

Example 6

3.2 g of isopropyl-(α,β)-D-glucopyranoside was dissolved in 50 ml of water. Under agitating, 1.44 g of anhydrous sodium carbonate, 0.7 g of sodium bromide and 17 mg of TEMPO were added thereto. While maintaining the obtained mixture at an inner temperature of 30° C. or below and agitating, 22 ml of an aqueous sodium hypochlorite solution containing 5% of active chlorine was dropped thereinto. After agitating for 1 hour, it was confirmed by HPLC (detection; RI, UV 210 nm, column: Shodex SUGAR SH1011, column temperature: 25° C., mobile phase: 0.1% aqueous solution of phosphoric acid) that isopropyl-(α,β)-D-glucopyranoside had been converted into isopropyl-D-glucopyranosiduronic acid at a ratio of 100%. Subsequently, 75 ml of a synthetic polystyrene resin "Sepabeads" SP207 (Mitsubishi Chemical Industries), which had been preliminarily washed and moistened with water, was added to the liquid reaction mixture under agitating at room temperature, thus adsorbing TEMPO in the liquid reaction mixture. After agitating for 30 minutes, the resin having TEMPO adsorbed thereon was filtered off. When the reaction mixture in the filtrate phase was examined by gas chromatography (detection: FID, column: G-100 (40m), detection temperature: 150° C.), it was confirmed that TEMPO had been recovered from the liquid reaction mixture at a ratio of almost 100%.

Referential Examples

Preparation of Adsorption Resin Column (1)

TEMPO (100 mg) was added to 50 ml of water and dissolved therein by agitating at room temperature to give an aqueous solution. Separately, 10 ml of "Sepabeads" SP207 (Mitsubishi Chemical Industries), which had been washed successively with methanol and water, was added to 100 ml of water. The former aqueous solution was dropped into the thus obtained aqueous mixture under agitation. After the completion of the dropping, agitation was continued for additional 20 minutes. The obtained Sepabeads having TEMPO adsorbed thereon was packed into a glass column and washed with water to give an adsorption resin column.

Preparation of Adsorption Resin Column (2)

A column packed with a resin having 4-acetamino-TEMPO adsorbed thereon was prepared by the same method as the one described in the above (1) but using 140 mg of 4-acetamino-TEMPO as a substitute for TEMPO.

Preparation of Adsorption Resin Column (3)

4-Benzoyloxy-TEMPO (180 mg) was added to 130 ml of a 60% aqueous solution of methanol and dissolved therein by agitating at room temperature. Separately, 10 ml of "Sepabeads" SP207 (Mitsubishi Chemical Industries), which had been washed successively with methanol and water, was packed into a column. The 4-benzoyloxy-TEMPO solution obtained above was circulated through the column for 30 minutes so as to allow the resin to adsorb 4-benzoyloxy-TEMPO. Next, the methanol was eliminated by passing 300 ml of water through the column to thereby give a resin column having 4-benzoyloxy-TEMPO adsorbed thereon.

Preparation of Adsorption Resin Column (4)

A column packed with a resin having 4-hydroxy-TEMPO adsorbed thereon was prepared by the same method as the one described in the above (1) but using 100 mg of 4-hydroxy-TEMPO as a substitute for TEMPO.

Example 7

Using Sodium Bromide as Electrolyte 70 g of glucose and an ion exchange resin "Amberlist" 15E (Rohm & Haas) were suspended in 600 ml of isopropanol and heated under reflux for 3 hours. Then the resin was filtered off and the transparent liquid thus obtained was concentrated. Subsequently, water was added to the residue to give an aqueous solution of isopropyl-($\alpha,\beta$)-D-glucopyranoside.

In a glass container (150 ml) provided with an agitating element, 10 g of sodium bromide and 1.75 g of sodium hydrogencarbonate were dissolved in 80 ml of water to give an electrolyte. Two carbon electrodes (i.e., an anode and a cathode; each 2 cm×3 cm in size) were located in the electrolyte at an interval of about 3 mm. By using a circulating pump, the electrolyte was introduced via a glass tube or a synthetic resin tube into the adsorption resin columns and passed therethrough. The liquid outflowing from the columns was returned to the container again, thereby constructing a circulation pathway. The electrolyte was thus circulated under agitation while adjusting the flow rate of the circulating pump to 20 ml/min.

An aqueous solution in an amount corresponding to 2 g of isopropyl-($\alpha,\beta$)-D-glucopyranoside was added to the electrolyte under circulation. Next, a direct current voltage of 5 V was applied to the electrodes and an electric current (0.01 to 0.03 A/cm$^2$) was passed. The agitation, current passage and circulation were continued at room temperature and the electrolyte under circulation was monitored by HPLC with the passage of time. About 30 hours thereafter, the peaks assignable to isopropyl-($\alpha,\beta$)-D-glucopyranoside almost disappeared, which indicated the completion of the oxidation reaction. At this point, the peaks assignable to isopropyl-($\alpha,\beta$)-D-glucopyranosiduronic acid thus formed were observed.

The electrolyte (liquid reaction mixture) was neutralized with dilute hydrochloric acid and adjusted to pH 1 or less. Then the inorganic ions were desalted and eliminated with the use of an electrodialyzer (Microacylyzer G3: Asahi Chemical Industry). The desalted solution thus obtained was concentrated to give 1.8 g of isopropyl-($\alpha,\beta$)-D-glucopyranosiduronic acid as a syrupy product.

HPLC Conditions column: Shodex SH1011 mobile phase: 0.1% phosphoric acid flow rate: 0.5 ml/min detection: RI, UV.

Example 8(1)

Using Sodium Chloride as Electrolyte 10 g of sodium chloride and 1.75 g of sodium carbonate were dissolved in 80 ml of water to give an electrolyte. Then a circulation pathway of the electrolyte, whereby the electrolyte was introduced from a container provided with electrodes into adsorption resin columns, was constructed as in Example 7.

An aqueous solution in an amount corresponding to 2 g of isopropyl-($\alpha,\beta$)-D-glucopyranoside was added to the electrolyte under circulation. Next, a direct current voltage of 5 V was applied to the electrodes and an electric current (0.01 to 0.03 A/cm$^2$) was passed.

The electrolyte under circulation was monitored by HPLC with the passage of time. About 6 hours thereafter, isopropyl-($\alpha,\beta$)-D-glucopyranoside had been converted into isopropyl-($\alpha,\beta$)-D-glucopyranosiduronic acid at a ratio of about 80%.

Example 8(2)

Scaling up the Materials 5-fold as in (1)

In a glass container (150 ml) provided with a jacket, 6.5 g of sodium chloride, 5 g of sodium hydrogencarbonate and 10 g of isopropyl-($\alpha,\beta$)-D-glucopyranoside were dissolved in 130 ml of water to give an electrolyte. While passing cooling water through the jacket of the glass container to thereby maintain the inner temperature at 30° C. or below, the electrolyte was introduced with a circulating pump into a diaphragm-free electrolysis cell (electrode area: 10 cm$^2$, anode: ruthenium oxide, cathode: titanium). The outlet of the electrolysis cell was connected to a column packed with 10 ml of a resin SP-207 having 140 mg of 4-acetamino-TEMPO adsorbed thereon and the electrolyte was continuously circulated through the system. Controlled-current (2 A) electrolysis was carried out and an electric current of 6 F/mol was passed. Thus, the HPLC peaks assignable to isopropyl-($\alpha,\beta$)-D-glucopyranoside disappeared.

The completion of the reaction was confirmed based on peaks assignable to isopropyl-($\alpha,\beta$)-D-glucopyranosiduronic acid formed in the liquid reaction mixture. Then the circulating electrolyte (liquid reaction mixture) was taken out from the circulation pathway. Next, a fresh electrolyte was newly prepared and 10 g of isopropyl-($\alpha,\beta$)-D-glucopyranoside was added. Thus, the above reaction was repeated by using the same adsorption resin column.

After repeating the reaction 6 times in total, the activity of the column was maintained.

Example 8(3)

Using 4-benzoyloxy-TEMPO as Catalyst

In a glass container (150 ml) provided with a jacket, 6.5 g of sodium chloride, 5 g of sodium hydrogencarbonate and 10 g of isopropyl-($\alpha,\beta$)-D-glucopyranoside were dissolved in 130 ml of water to give an electrolyte. While passing cooling water through the jacket of the glass container to thereby maintain the inner temperature at 30° C. or below, the electrolyte was introduced with a circulating pump into a diaphragm-free electrolysis cell (electrode area: 10 cm$^2$, anode: iridium dioxide, cathode: titanium). The outlet of the electrolysis cell was connected to a column packed with 10 ml of a resin SP-207 having 180 mg of 4-benzoyloxy-TEMPO adsorbed thereon and the electrolyte was continuously circulated through the system. Controlled-current (2.0 A) electrolysis was carried out and an electric current of 8 F/mol was passed. Thus, it was confirmed by HPLC (detection: RI, UV 210 nm, column: Aminex HPX-87H, column temperature: 40° C., mobile phase: 0.01 N aqueous solution of sulfuric acid) that isopropyl-(α,β)-D-glucopyranosiduronic acid was obtained at a yield of 78%.

Example 9(1)

Cycle test of Adsorption Resin Column 10 g of sodium bromide and 1.75 g of sodium carbonate were dissolved in 80 ml of water to give an electrolyte. Subsequently, a circulation pathway of the electrolyte, whereby the electrolyte was introduced from a container provided with electrodes into an adsorption resin column with a circulating pump, was constructed as in Example 1.

Next, 2 g of methyl-α-D-glucopyranoside was added to the electrolyte under circulation. Next, a direct current voltage of 5 V was applied to the electrodes and an electric current (0.01 to 0.03 A/cm$^2$) was passed. After about 3 hours, the HPLC peak assignable to methyl-α-D-glucopyranoside disappeared. The completion of the reaction was confirmed based on a peak assignable to methyl-α-D-glucopyranosiduronic acid thus formed in the liquid reaction mixture. Then the circulating electrolyte (liquid reaction mixture) was taken out from the circulation pathway. Next, a fresh electrolyte was newly prepared and 2 g of methyl-α-D-glucopyranoside was added. Thus, the above reaction was repeated by using the same adsorption resin column.

After repeating the reaction 5 times in total, the activity of the column was not deteriorated.

The liquid reaction mixtures obtained from these 5 reactions were combined and adjusted to pH 1 or below with a diluted aqueous solution of hydrogen bromide. Next, it was treated with an electrodialyzer (Microacylyzer G3: Asahi Chemical Industry). Thus, an aqueous solution containing 8.5 g of methyl-α-D-glucopyranosiduronic acid was obtained and, at the same time, the aqueous solution of sodium bromide was recovered.

Example 9(2)

Scaling up the Materials 5-fold as in (1)

In a glass container (150 ml) provided with a jacket, 6.5 g of sodium chloride, 5 g of sodium hydrogencarbonate and 10 g of methyl-α-D-glucopyranoside were dissolved in 130 ml of water to give an electrolyte. While passing cooling water through the jacket of the glass container to thereby maintain the inner temperature at 30° C. or below, the electrolyte was introduced with a circulating pump into a diaphragm-free electrolysis cell (electrode area: 10 cm$^2$, anode: ruthenium oxide, cathode: titanium). The outlet of the electrolysis cell was connected to a column packed with 50 ml of a resin SP-207 having 100 mg of TEMPO adsorbed thereon and the electrolyte was continuously circulated through the system. Controlled-current (2.6 A) electrolysis was carried out and an electric current of 6 F/mol was passed. Thus, it was confirmed by HPLC (detection: RI, UV 210 nm, column: Aminex HPX-87H, column temperature: 40° C., mobile phase: 0.01 N aqueous solution of sulfuric acid) that methyl-α-D-glucopyranosiduronic acid was obtained at a yield of 92%.

Example 10

Hydrolysis of the Oxidation Product and Acquisition of Glucuronic Acid (Lactone)

5 ml of sulfuric acid was added to an aqueous solution of isopropyl-(α,β)-D-glucopyranosiduronic acid in an amount corresponding to 10 g of isopropyl-(α,β)-D-glucopyranosiduronic acid and the obtained mixture was diluted with water so as to give a total volume of 100 ml. Next, the liquid reaction mixture was heated under reflux in a glass container (200 ml) provided with a reflux condenser. It was sampled with the passage of time and each sample was examined by HPLC. After about 3 hours, the peak assignable to isopropyl-(α,β)-D-glucopyranosiduronic acid became about 5% or less. Then the reaction was ceased and the liquid reaction mixture was cooled to room temperature.

Isopropanol formed by the hydrolysis was evaporated off under reduced pressure. Next, the residue was diluted again and electrodialyzed with an electrodialyzer (Model TS, Tokuyama) until the conductivity of the liquid reaction mixture attained 3.66 mS/cm, thus removing sulfuric acid. The eluate from which sulfuric acid had been almost completely removed was passed through 5 ml of a cation exchange resin (SK1B, Mitsubishi Chemical Industries) and then concentrated to about 30 ml. 2 g of a decoloring carbon powder was added to the concentrate and the resultant mixture was agitated at room temperature for 10 minutes and filtered. The filtrate was combined with the washing water and the mixture was concentrated to about 20 ml by heating. When the concentrate was cooled with ice-water and agitated, glucuronolactone crystals were precipitated out. The mother liquid was concentrated again by heating and the same treatment was repeated to give secondary crystals. Thus 7 g of the glucuronolactone crystals were obtained in total. When recrystallized from hot water, the IR spectrum of the recrystallized product agreed with that of a standard.

Industrial Applicability

According to the present invention, an amine oxide usable as an oxidizing catalyst in a reaction of oxidizing an organic compound can be produced safely, conveniently and efficiently. In the present invention, the step of activating the catalyst and the oxidization step can be separately carried out. Thus the liquid reaction mixture can be repeatedly circulated alternately in an electrolytic reaction cell and an oxidation cell, which makes it possible to perform the oxidation reaction more efficiently, thereby producing the aimed product more efficiently. When the method of the present invention is applied to the production of glucuronic acid or glucuronolactone, moreover, these compounds can be safely produced without resort to any nitrogen oxide such as nitric acid.

We claim:

1. A method for selectively oxidizing the primary hydroxyl group of an organic compound, which comprises reacting a resin having an amine oxide adsorbed thereon and a halogen-containing oxidant with the organic compound having the primary hydroxyl group.

2. A method for selectively oxidizing the primary hydroxyl group of an organic compound, which comprises reacting a resin having an amine oxide adsorbed thereon and an electrolytically oxidized product of a halogen-containing compound with the organic compound having the primary hydroxyl group.

3. The oxidization method as claimed in claim 2, wherein an oxidization cell, in which said resin having an amine oxide adsorbed thereon and an electrolytically oxidized product of a halogen-containing compound are reacted with the organic compound having the primary hydroxyl group, and an electrolysis cell, in which said halogen-containing compound is electrolytically oxidized, are located separately.

4. The oxidization method as claimed in claim 3, wherein said oxidization cell and said electrolysis cell are independently provided in a reaction cycle and the reaction is carried out while circulating the halogen-containing compound and the organic compound having the primary hydroxyl group in this reaction cycle.

5. The oxidization method as claimed in claim 4, wherein said resin is a polyacrylic resin, a polystyrene resin or a polyalkylene resin.

6. The oxidization method as claimed in claim to 4, wherein said organic compound is an optionally substituted saccharide.

7. The oxidization method as claimed in claim 5, wherein said organic compound is an optionally substituted saccharide.

8. A method for producing an uronic acid derivative by using the oxidization method as claimed in claim 6.

9. A method for producing an uronic acid derivative by using the oxidization method as claimed in claim 7.

10. The production method as claimed in claim 8, wherein said uronic acid derivative is a glucuronic acid derivative.

11. The production method as claimed in claim 9, wherein said uronic acid derivative is a glucuronic acid derivative.

12. A method for producing a glucuronic acid derivative, which comprises reacting an optionally substituted saccharide and a resin having an amine oxide adsorbed thereon with an electrolytically oxidized product of a halogen-containing compound.

13. A method for producing a glucuronic acid or glucuronolactone, which comprises hydrolyzing a glucuronic acid derivative obtained by oxidizing an optionally substituted saccharide with the use of a resin having an amine oxide adsorbed thereon as a catalyst.

14. The oxidization method as claimed in claim 3, wherein said resin is a polyacrylic resin, a polystyrene resin or a polyalkylene resin.

15. The oxidization method as claimed in claim 2, wherein said resin is a polyacrylic resin, a polystyrene resin or a polyalkylene resin.

16. The oxidization method as claimed in claim 1, wherein said resin is a polyacrylic resin, a polystyrene resin or a polyalkylene resin.

17. The oxidization method as claimed in claim 1, wherein said organic compound is an optionally substituted saccharide.

18. A method for producing an uronic acid derivative by using the oxidization method as claimed in claim 17.

19. A method for producing an uronic acid derivative by using the oxidization method as claimed in claim 18.

* * * * *